(12) United States Patent
McQuade

(10) Patent No.: US 8,117,322 B1
(45) Date of Patent: Feb. 14, 2012

(54) LATENCY REDUCTION ON HTTP SERVERS

(75) Inventor: Bryan McQuade, Concord, MA (US)

(73) Assignee: Google Inc., Mountain View, CA (US)

( * ) Notice: Subject to any disclaimer, the term of this patent is extended or adjusted under 35 U.S.C. 154(b) by 77 days.

(21) Appl. No.: 12/635,394

(22) Filed: Dec. 10, 2009

(51) Int. Cl.
*G06F 13/00* (2006.01)
(52) U.S. Cl. .................... 709/228; 709/219; 709/225
(58) Field of Classification Search .......... 709/217, 709/219, 223, 225, 227, 228, 229
See application file for complete search history.

(56) References Cited

U.S. PATENT DOCUMENTS

2002/0055966 A1 * 5/2002 Border et al. ............... 709/200
* cited by examiner

*Primary Examiner* — Viet Vu
(74) *Attorney, Agent, or Firm* — Fish & Richardson P.C.

(57) ABSTRACT

Methods, systems, and computer-readable medium for latency reduction on Hypertext Transfer Protocol (HTTP) servers using User Datagram Protocol (UDP) are disclosed. In situations where a client needs to establish a new TCP connection to submit an HTTP request to a server, the client sends the HTTP request in a UDP datagram to the server while the TCP connection establishment is in progress. The server starts anticipatory construction of a response upon receipt of the HTTP request in the UDP datagram. After the TCP connection is established, the client sends and the server receives the same HTTP request in one or more data packets through the newly established TCP connection. In response to the receipt of the HTTP request through the newly established TCP connection, the server sends the pre-constructed response to the client through the TCP connection. HTTP response time can be reduced up to one round-trip time.

19 Claims, 6 Drawing Sheets

400

```
┌─────────────────────────────────────────────────────────────────┐
│ Notifying a client of support for anticipatory preparation of   │
│ HTTP responses in response to corresponding HTTP requests       │
│ embedded in corresponding UDP datagrams.                        │
│                                                            408  │
└─────────────────────────────────────────────────────────────────┘
                                 ↓
┌─────────────────────────────────────────────────────────────────┐
│ Receiving a Transmission Control Protocol (TCP) connection      │
│ request from the client                                         │
│                                                            410  │
└─────────────────────────────────────────────────────────────────┘
                                 ↓
┌─────────────────────────────────────────────────────────────────┐
│ Prior to completion of a TCP connection establishment for the   │
│ TCP connection request, receiving a User Datagram Protocol      │
│ (UDP) datagram from the client, the UDP datagram comprising     │
│ an HTTP request                                            412  │
└─────────────────────────────────────────────────────────────────┘
                                 ↓
┌─────────────────────────────────────────────────────────────────┐
│ In response to receiving the UDP datagram, preparing an HTTP    │
│ response according to the HTTP request in the UDP datagram      │
│                                                            414  │
└─────────────────────────────────────────────────────────────────┘
                                 ↓
┌─────────────────────────────────────────────────────────────────┐
│ After completion of the TCP connection establishment, receiving │
│ one or more TCP data packets from the client through the        │
│ established TCP connection, the one or more TCP data packets    │
│ comprising the HTTP request                                416  │
└─────────────────────────────────────────────────────────────────┘
                                 ↓
┌─────────────────────────────────────────────────────────────────┐
│ In response to receiving the one or more TCP data packets,      │
│ sending the prepared HTTP response to the HTTP client through   │
│ the established TCP connection                                  │
│                                                            418  │
└─────────────────────────────────────────────────────────────────┘
```

FIG. 4

LATENCY REDUCTION ON HTTP SERVERS

BACKGROUND

Hypertext Transfer Protocol (HTTP) is an application-level protocol for retrieving interlinked resources, such as webpages, on the World Wide Web. HTTP specifies the standard for requests and responses between a client and a server. Examples of HTTP clients include web browsers, web crawlers, and other end-user software tools that make requests on behalf of users in accordance with the HTTP standard. Examples of HTTP servers include web servers hosting webpages and servers of other internet resources that respond to HTTP requests.

Typically, when an HTTP client initiates an HTTP request, it first establishes a Transmission Control Protocol (TCP) connection to a dedicated port on an HTTP server. TCP connection establishment uses a three-way handshake. First the client initiates the connection establishment by sending a connection request (e.g., in a SYN packet) to the server. In response, the server replies with an acknowledgement of the connection request (e.g., a SYN-ACK packet). Finally, the client sends an acknowledgement (e.g., an ACK packet) back to the server for the receipt of the server's acknowledgement. At this point, the TCP connection between the client and the server is established, and the client and server can begin data transfer to each other through the established TCP connection.

In contrast to TCP, User Datagram Protocol (UDP) is a message-based connectionless protocol that does not require hand-shaking dialogues for guaranteeing reliability, ordering, or data integrity. Communication is achieved by transmitting information in one direction from source to destination without verifying the readiness or state of the receiver.

SUMMARY

In general, one aspect of the subject matter described in this specification can be embodied in a method that includes receiving a request to forward an Hypertext Transfer Protocol (HTTP) request to an HTTP server. Upon receipt of the request, a Transmission Control Protocol (TCP) connection request is sent to the HTTP server. A User Datagram Protocol (UDP) datagram including the HTTP request is prepared. Prior to receipt of an acknowledgement of the TCP connection request from the HTTP server, the UDP datagram is forwarded to the HTTP server. Upon receipt of the acknowledgement of the TCP connection request from the HTTP server, the TCP connection establishment process is completed. The HTTP request is forwarded to the HTTP server through the established TCP connection.

These and other embodiments can each optionally include one or more of the following features.

In some implementations, the method further includes, prior to preparation of the UDP datagram, determining whether the HTTP server supports anticipatory preparation of HTTP responses for corresponding HTTP requests embedded in corresponding UDP datagrams; and preparing and forwarding the UDP datagram only if the HTTP server supports the anticipatory preparation.

In some implementations, the method further includes receiving an HTTP response from the HTTP server through the established TCP connection, where the HTTP response has been prepared in response to receipt of the UDP datagram by the HTTP server.

Another aspect of the subject matter described in this specification can be embodied in a method that includes receiving a Transmission Control Protocol (TCP) connection request from a client. Prior to completion of a TCP connection establishment for the TCP connection request, a User Datagram Protocol (UDP) datagram is received from the client, the UDP datagram including an HTTP request. In response to receipt of the UDP datagram, an HTTP response is prepared according to the HTTP request in the UDP datagram. After completion of the TCP connection establishment, one or more TCP data packets are received from the client through the established TCP connection, the one or more TCP data packets including the HTTP request. In response to receipt of the one or more TCP data packets, the prepared HTTP response is sent to the HTTP client through the established TCP connection.

These and other embodiments can each optionally include one or more of the following features.

In some implementations, the method further includes, prior to receipt of the UDP datagram, notifying the client of support for anticipatory preparation of HTTP responses for corresponding HTTP requests embedded in corresponding UDP datagrams.

In some implementations, the method further includes issuing a cookie to the client in a prior HTTP session, the cookie identifying a URL for which the anticipatory preparation of HTTP responses is supported.

In some implementations, the method further includes contacting a backend component for resources needed to construct the HTTP response.

In some implementations, preparation of the HTTP response in response to receiving the UDP datagram is completed after the one or more TCP data packets are received.

In some implementations, the prepared HTTP response is sent to the HTTP client only if the one or more TCP data packets have been received within a predetermined period of time after the UDP datagram was received.

In some implementations, the prepared HTTP response is sent to the HTTP client only if the one or more TCP data packets have been received within a predetermined period of time after the HTTP response has been prepared.

In some implementations, the method further includes receiving a second TCP connection request from a second HTTP client. After a second TCP connection is established with the second HTTP client, a second HTTP request is received from the second HTTP client through the second TCP connection. It is determined whether a previous UDP datagram including the second HTTP request has been received. If no previous UDP datagram including the second HTTP request has been received, a second HTTP response for the second HTTP request is prepared. The second HTTP response is sent when preparation of the second HTTP response is completed.

In some implementations, the HTTP request is for search results responsive to a search query.

In some implementations, the HTTP request is for invoking an application serving database resources.

Another aspect of the subject matter described in this specification can be embodied in a method that includes receiving a request to forward a Hypertext Transfer Protocol (HTTP) request to an HTTP server. Upon receipt of the request, a Transmission Control Protocol (TCP) connection request to the HTTP server is initiated. Prior to establishment of the TCP connection, a datagram including the HTTP request is prepared, and forwarded to the HTTP server using a connectionless protocol. When the TCP connection is established, the HTTP request is forwarded in one or more data packets to the HTTP server through the established TCP connection. An HTTP response is received from the HTTP server, the HTTP response having been prepared in response to the datagram and having been sent in response to the one or more data packets.

Another aspect of the subject matter described in this specification can be embodied in a method that includes receiving a datagram from a client using a connectionless protocol, the datagram including an HTTP request. An HTTP response is prepared according to the HTTP request in the datagram. The HTTP request is received in one or more data packets from the client through a newly established TCP connection. In response to receipt of the one or more data packets, the HTTP response is sent to the HTTP client through the newly established TCP connection.

Other embodiments of these aspects include corresponding systems, apparatus, and computer programs, configured to perform the actions of the methods, encoded on computer storage devices.

Particular embodiments of the subject matter described in this specification can be implemented to realize one or more of the following advantages.

When a user agent (e.g., a web browser) initiates an HTTP request to a server, if no existing TCP connection to the server is available, the user agent typically needs to open a TCP connection before it can send the HTTP request to the server. Opening a TCP connection typically adds one round-trip time to the overall response time due to the three-way handshake required for TCP connection establishment. Modern browsers maintain a TCP connection pool for recently accessed servers; however, not every HTTP request starts on an existing TCP connection. A significant number of HTTP requests received by a server arrive at the server through a freshly established TCP connection. When the server processing time exceeds the round-trip time, anticipatory preparation of HTTP responses using UDP datagrams can reduce page load time for HTTP requests issued on the freshly established TCP connections by up to one round-trip time (RTT).

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIG. 4 is a flow diagram for an example server-side process implementing latency reduction using UDP.

Like reference numbers and designations in the various drawings indicate like elements.

DETAILED DESCRIPTION

Figure 1:
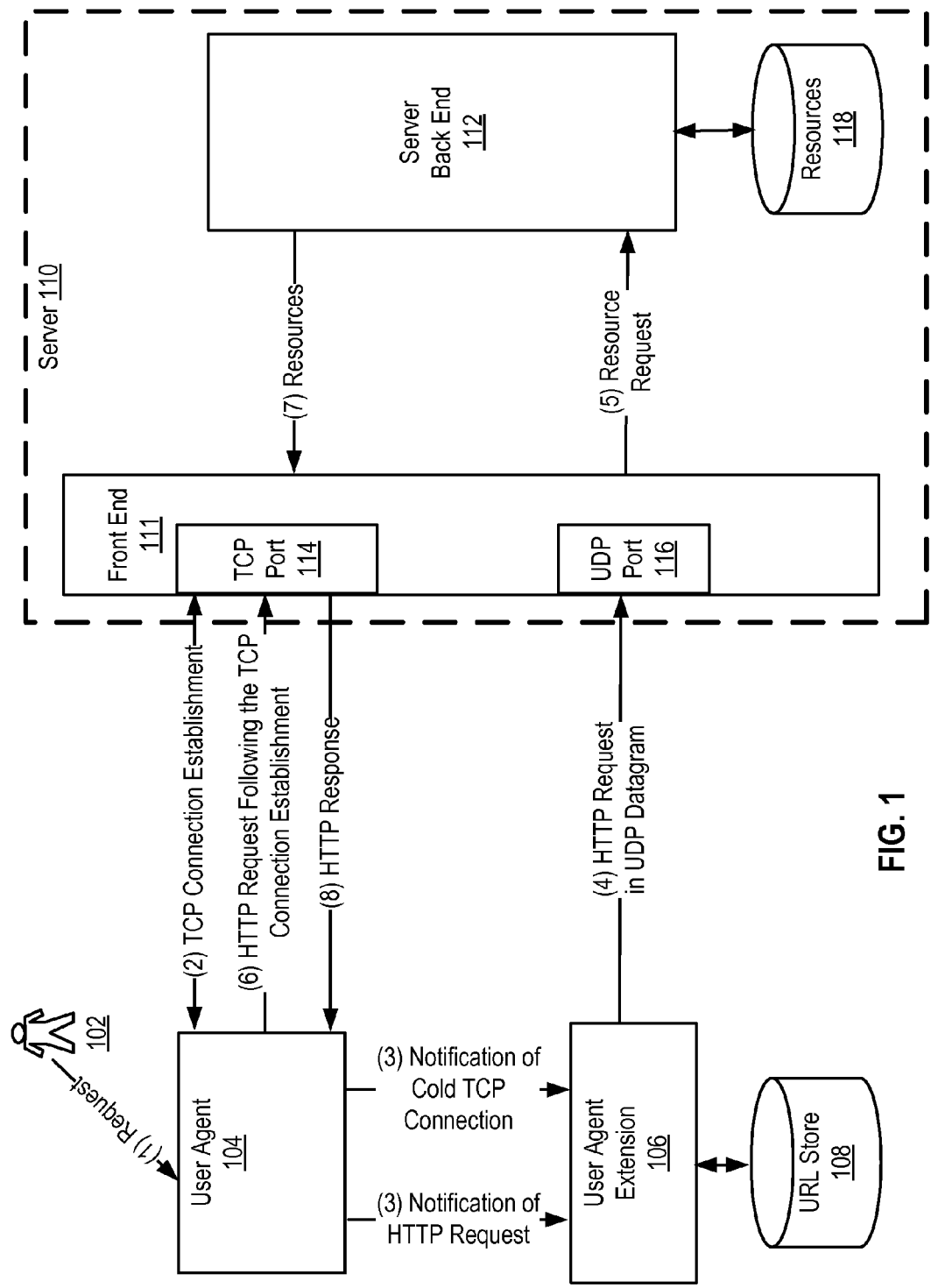
FIG. 1 is a block diagram illustrating example interactions between a user agent and a server for latency reduction using UDP.

FIG. 1 illustrates example interactions between a user agent and an HTTP server implementing latency reduction using the User Datagram Protocol (UDP).

Examples of a user agent or HTTP client include a web browser, a web crawler, or other software applications that are capable of sending requests and receiving responses from a server according to the HTTP protocol. Other types of user agents are possible. Examples of HTTP servers include web servers configured to serve webpages, internet databases, search engines, internet mail servers, and so on. HTTP servers can include a front-end component for communicating with user agents for TCP connection establishment and for receiving requests and sending responses using the HTTP protocol. HTTP servers can also include backend components for gathering resources and performing data processing or computation for constructing HTTP responses according to the HTTP requests that have been received by the frontend component. In some implementations, an HTTP server includes a distributed network of computers and databases that serve as either or both the server frontend component and the server backend component. The backend component communicates with the frontend component using various communication protocols.

As shown in FIG. 1, a user agent 104 (e.g., a web browser) receives a request from a user or an executing software program 102 to forward an HTTP request to a server 110. For example, when the user 102 submits a Uniform Resource Locator (URL) in a browser's address bar or clicks on a link in a currently displayed webpage, the browser determines the identity (e.g., domain name) of the server from the URL, and constructs an HTTP request to forward to the server according to the URL. An example HTTP request for a homepage hosted on www.example.com is GET /index.html HTTP/1.1
Host: www.example.com The user agent 104 determines whether a TCP connection already exists between the user agent 104 and the server 110. If a TCP connection to the server 110 already exists, the user agent 104 forwards the HTTP request to the server 110 through the existing TCP connection, and no latency reduction using UDP needs to be performed.

However, if no TCP connection exists between the user agent 104 and the server 110 (or if the user agent 104 determines that a new TCP connection needs to be established), the user agent 104 proceeds to initiate the process to establish a new TCP connection to the server 110. The TCP connection establishment process starts with the user agent 104 sending a TCP connection request (e.g., a SYN packet) to a dedicated TCP port (e.g., port 80) of the server 110. The dedicated TCP port is shown as component 114 in FIG. 1. Where the server 110 is divided into a frontend component and a backend component, the TCP connection request is sent to the server frontend component 111. The user agent 104 then waits for an acknowledgement (e.g., a SYN-ACK packet) from the server 110. Once the user agent 104 receives the acknowledgement from the server 110, it can proceed to complete the connection establishment process by sending out an acknowledgement of the acknowledgment (e.g., an ACK packet).

While the TCP connection establishment process is underway, the user agent 104 also notifies a user agent extension 106 about the HTTP request and that a new TCP connection is being established to server 110. The user agent extension 106 can be a component of the user agent 104. Alternatively, the user agent extension 106 can also be a plug-in or standalone component that communicates with the user agent 104. Other types of user agents are possible.

The user agent extension 106 determines whether the server 110 supports anticipatory preparation of HTTP responses in response to HTTP requests received in UDP datagrams. In some implementations, the user agent extension 106 queries a URL store 108 to determine if the server is among a list of servers that had previously notified the user agent 104 of the servers' support for this latency reduction mechanism. The URL store 108 can be implemented as a list of domain names or URLs for HTTP servers. Alternatively, the URL store 108 can be a collection of cookies issued to the user agent 108 in prior HTTP sessions when the user agent 104 had contacted the servers. Other implementations are possible. For example, HTTP servers can register with a central database for offering support for this latency reduction mechanism, and the user agent extension 106 can obtain a list of registered HTTP servers from the central database. A copy of the list can be maintained locally for speedy lookups by the user agent extension 106.

If the intended server for the HTTP request is found to support the latency reduction mechanism using UDP, the user agent extension 106 proceeds to prepare a UDP datagram that includes the HTTP request. The user agent extension 108 sends the prepared UDP datagram to a dedicated UDP port on the server 110. The dedicated UDP port is shown as component 116 in FIG. 1. Where the server 110 has a frontend component 111, the UDP datagram is sent to a UDP port (component 116 in FIG. 1) of the frontend component 111. If the server frontend includes a distributed network of computers, the TCP port (component 114 in FIG. 1) and the UDP port (component 116 in FIG. 1) may be located on different computers in the distributed network.

Because UDP is a connectionless protocol, the user agent extension 106 can send out the HTTP request in the UDP datagram immediately rather than having to establish an end-to-end connection first. Therefore, the UDP datagram is likely to arrive at the UDP port 116 before the TCP connection establishment is completed.

Once the server 110 receives the HTTP request in the UDP datagram from the user agent extension 106, the server 110 can proceed to prepare the HTTP response according to the HTTP request in the UDP datagram. The preparation of the HTTP response can proceed in parallel with the establishment of the TCP connection.

In some implementations, the server 110 includes a frontend component 111 and a backend component 112, and the frontend component 111 receives the HTTP request in the UDP datagram. The preparation of the HTTP response can be completed by the server frontend 111. The server frontend 111 holds the prepared HTTP response until the same HTTP request is received from the user agent 104 through the newly established TCP connection between the user agent 104 and the server 110. Once the same HTTP request is received from the user agent 104 through the newly established TCP connection, the server frontend 111 can forward the prepared HTTP response to the user agent 104 through the newly established TCP connection. All subsequent HTTP communications between the user agent 104 and the server frontend 111 are transmitted through the TCP connection until the connection is closed by either or both parties.

In situations where a large amount of resources and data are needed to construct the HTTP response, the resource collection and data processing can be performed by a backend component 112 of the server 110. For example, in the case of an internet mail server, the server backend 112 can include a database 118 for storing user profiles and data, and the server backend 112 extracts and processes the stored data in the database 118 in response to HTTP requests sent from each individual user. Once the server backend 112 gathers and processes the resources necessary to construct an HTTP response, the server backend 112 can forward the resources and information to the server frontend 111 to prepare the response. Other division of responsibilities between the server frontend and the server backend are possible. For example, the server backend can complete the preparation of the HTTP response and forward the completed response to the frontend, so the server frontend only needs to send the response out to the requesting client. The HTTP server frontend also handles the correlation between the prepared response and the correct HTTP request received through the TCP connection. In some implementations, a partial HTTP response can be sent to the client before the entire HTTP response is constructed. For example, when sufficient amount of data is available to construct a partial response, the partial response can be sent first while the rest of the response is under construction.

The correlation between the prepared HTTP response and the correct HTTP request received through a TCP connection can be realized in a number of ways. In one example, the HTTP client associates a unique identifier with an HTTP request it plans to send to the HTTP server. The HTTP client includes the unique identifier with the HTTP request in the UDP datagram. The HTTP client also includes the unique identifier in the header of the HTTP request sent through the newly established TCP connection. The HTTP server uses this unique identifier to correlate the HTTP request received in the UDP datagram and the HTTP request received through the newly established TCP connection. The HTTP server then sends the pre-constructed response to the correct HTTP client through the correct TCP connection based on the correlation.

Because the completion of the HTTP response and the receipt of the corresponding HTTP request often lag in time, the HTTP server needs to determine when a response is ready to be sent out. A response is ready to be sent out when the response is prepared and the corresponding HTTP request has been received through a newly established TCP connection. In some implementations, the HTTP server utilizes a state table for the HTTP requests received in UDP datagrams to determine when a prepared response is ready to be sent out. The state table is indexed by the unique identifier associated with each HTTP request. Other methods to keep track of the completion of HTTP responses and the arrival of corresponding HTTP requests through newly established TCP connections are possible.

In some scenarios, the HTTP response preparation is completed before the HTTP request is received from the user agent 104 through the TCP connection. In such scenarios, the HTTP response and associated unique identifier is stored until the corresponding HTTP request is received from the newly established TCP connection. When the server subsequently receives the HTTP request having the same unique identifier, the server frontend 111 fetches the correct response and forwards it to the user agent 104. The server then discards all entries (HTTP request, HTTP response, and associated information) in the state table associated with that unique identifier.

In some scenarios, the TCP connection establishment process is unsuccessful, and the user agent 104 or the server 110 may abandon the effort to establish the TCP connection after a period of time. In such scenarios, the server frontend 111 stores the prepared HTTP response for a predetermined period of time, and discards it if no corresponding HTTP request has been received through a TCP connection within the predetermined period of time. In an example implementation, a timer is set in the state table when the response preparation is completed to track the expiration time of the response.

In some scenarios, the TCP connection establishment process completes successfully and the HTTP request is received before the HTTP response preparation is completed. In such scenarios, the server 110 detects that the same HTTP request has been received in a UDP datagram, and that preparation of the HTTP response is still underway. The server 110 does not proceed to prepare a new HTTP response, but simply waits for the HTTP response preparation to complete. As soon as the response preparation is completed, the server frontend 111 forwards the prepared response to the user agent 104 through the newly established TCP connection. In some implementations, if a large amount of processing is needed to construct the HTTP response, the server can prepare a partial response is sufficient amount of data is currently available to construct a meaningful partial response. The partial response can be sent to the client while construction of the complete response is still underway. In some implementations, after waiting for a predetermined period of time, the server 110 determines that the preparation of the HTTP response has been delayed abnormally, and initiates construction of a new HTTP response according to the HTTP request. The server frontend 111 forwards the response that is completed first.

All subsequent communications between the user agent 104 and the server 110 are carried out through the established TCP connection. Since UDP is a connectionless protocol, it is possible that the UDP datagram including the HTTP request does not arrives intact or in time. However, since the HTTP request in the UDP datagram only serves to reduce latency, loss or delay of the datagram does not worsen the response speed. If an HTTP request arrives at the server frontend through a newly established TCP connection, but no corresponding HTTP request is found to have arrived in a UDP datagram prior to receipt of the HTTP request through the newly established TCP connection, then the server 110 proceeds to construct the response upon receipt of the HTTP request through the TCP connection. If subsequently, the same HTTP request arrives in a UDP datagram, the datagram is discarded either right away or after a predetermined period of time.

In some scenarios, where the server frontend 111 includes a distributed network of computers, and the UDP datagram and the TCP data packets including the same HTTP request are likely to arrive at different server computers. In such scenarios, an integrated database can be set up to keep track of the HTTP requests which correlates the HTTP request from TCP connections and the HTTP requests through UDP by their unique identifiers, for example.

Figure 2:
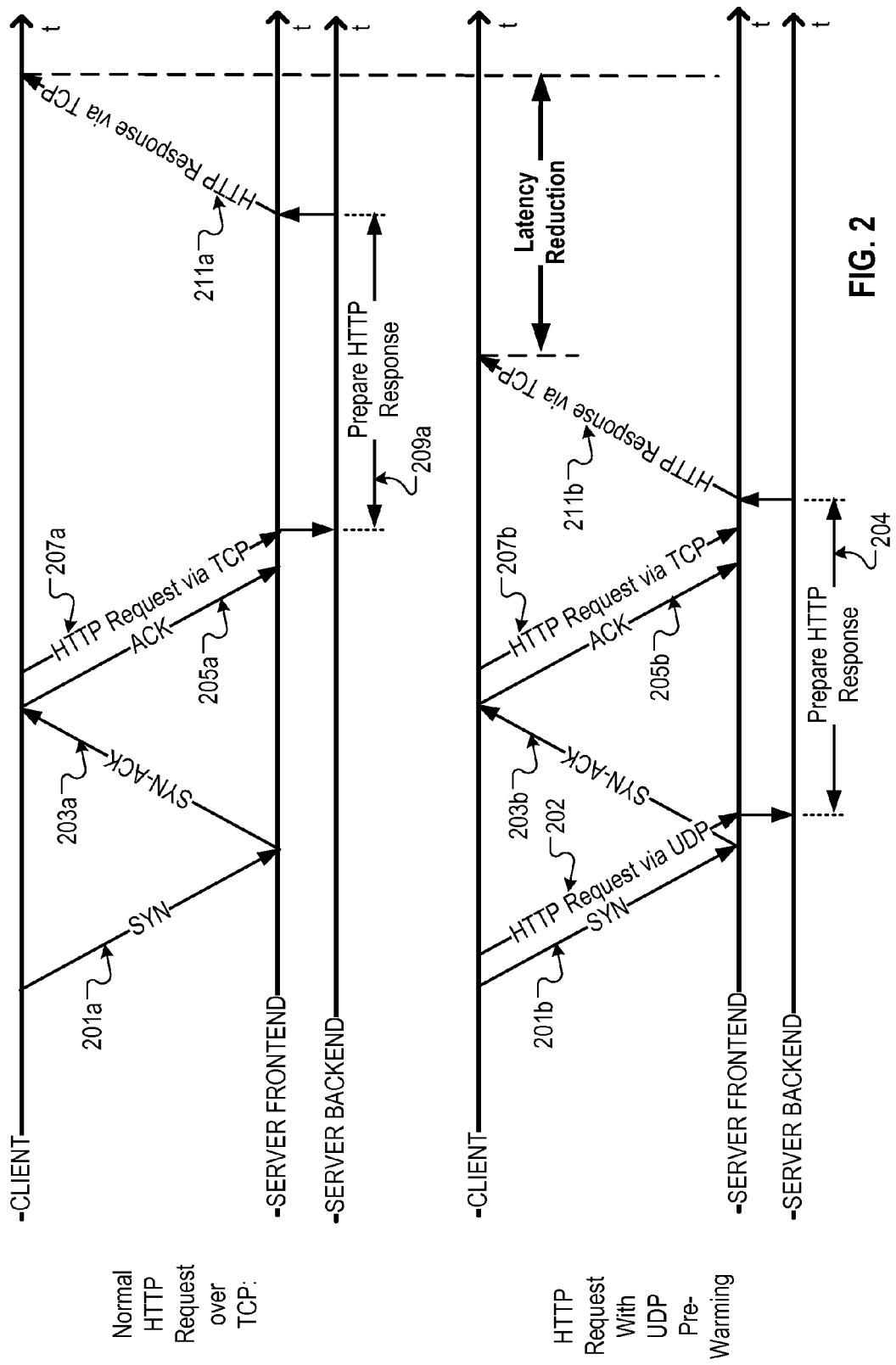
FIG. 2 is a timeline comparison between a conventional HTTP Request-Response process and an HTTP Request-Response process with latency reduction using UDP.

FIG. 2 illustrates a timeline comparison between a conventional HTTP Request-Response process and a HTTP Request-Response process with latency reduction using UDP.

The top portion of FIG. 2 illustrates an example timeline for sending an HTTP request by opening a new TCP connection, and receiving an HTTP response through the new TCP connection. For illustrative purposes, the timelines for the server frontend and the server backend are shown separately. However, it is also possible that the server frontend and the server backend are a single component with a single timeline.

The bottom portion of FIG. 2 illustrates an example timeline for sending an HTTP request by opening a new TCP connection, and by sending the same HTTP request in a UDP datagram in parallel with the TCP connection establishment, and receiving the HTTP response through the newly established TCP connection. The timeline for the server shows that the preparation of the HTTP response starts when the HTTP request is received in an UDP datagram. Because the HTTP response preparation starts prior to receipt of the HTTP request through the TCP connection, the time needed to receive the HTTP response from the server is reduced by an amount up to one round-trip time.

Specifically, in the conventional process of sending an HTTP request and receiving an HTTP response through a TCP connection, first the client needs to establish a TCP connection if no such TCP connect already exists between the client and the server. The TCP connection establishment process starts by the client sending out a connection request in an HTTP SYN packet to the server frontend (201a). This process 201a takes a time $T_1$. The server responds with a SYN-ACK packet to the client (203a). This process 203a takes a time $T_2$. Upon receipt of the server's SYN-ACK packet, the client sends out another ACK packet to the server (205a). Once the server receives the ACK packet from the client, each of the client and the server has sent out and received a SYN and an ACK. The connection establishment is completed and the client and the server can start communicating through the established TCP connection. Immediately following the ACK packet, the user sends out data packets including the HTTP request through the TCP connection to the server (207a). The reliability, ordering, and integrity of the HTTP request are ensured by various mechanisms specified by the TCP protocol. The process for completing the TCP connection establishment and sending/receiving an HTTP request through the newly established TCP connection takes a time $T_3$.

Once the HTTP request is received through the newly established TCP connection, the server frontend notifies the server backend to start preparation of the HTTP response according to the HTTP request. Once the server backend completes preparation of the HTTP response, it notifies the server frontend. The preparation of the HTTP response (209a) takes a time $T_4$. $T_4$ includes the time needed for the communications between the server frontend and the server backend.

Once the server frontend receives the completed HTTP response from the server backend, it proceeds to forward the response to the client (211a). This process takes a time $T_5$. Therefore, the total time for a client to send an HTTP request through a new TCP connection and to receive the HTTP response is $T=T_1+T_2+T_3+T_4+T_5$. Assuming $T_1$, $T_2$, $T_3$, $T_5$ are comparable in duration. The total time is about two round-trip time(s) plus the time for preparing the HTTP request.

In the lower portion of FIG. 2, the timeline shows the client also first starts to establish a TCP connection if no such TCP connect already exists between the client and the server. The TCP connection establishment process starts by the client sending out a connection request in an HTTP SYN packet to the server frontend (201b). This process 201b takes a time $T_1$. Immediately following the TCP connection request, the client also sends out the HTTP request in a UDP datagram to the server frontend (202). It takes approximately the same amount of time $T_1$ for the UDP datagram to arrive at the server frontend. When the server receives the SYN packet, the server responds with a SYN-ACK packet to the client (203b). This process 203b takes a time $T_2$. When the server frontend receives the HTTP request in the UDP datagram, the server starts preparation of the HTTP response (204). The process to prepare the HTTP response takes a time $T_4$. However, the preparation of the HTTP response proceeds in parallel to the HTTP connection establishment process.

Upon receipt of the server's SYN-ACK packet, the client sends out another ACK packet to the server (205b). Once the server receives the ACK packet from the client, each of the client and the server has sent out and received a SYN and an ACK. The connection establishment is completed and the client and the server start communicating through the established TCP connection. Immediately following the ACK packet, the client sends out data packets including the HTTP request through the TCP connection to the server (207b). The final acknowledgement to complete the TCP connection establishment and the sending/receiving of an HTTP request through the newly established TCP connection take a total of time $T_3$.

Once the HTTP request is received through the newly established TCP connection, the server frontend determines if a response has already been prepared for the HTTP request, and if so, the server frontend forwards the prepared HTTP response to the client through the newly established TCP connection (211b). The process 211b takes a time $T_5$. Therefore, the total amount of time needed to send an HTTP request and receive an HTTP response with latency reduction using UDP is $T'=T_1+T_2+T_3+T_5+(T_4-T_2-T_3)=T_1+T_4+T_5$, if $T_4>T_2+T_3$. The total latency reduction is $T_2+T_3$ in this scenario. If $T_4<T_2+T_3$, the total time is $T'=T_1+T_2+T_3+T_5$, and the total saving is $T_4$. Therefore, the total latency reduction using this method is up to one round trip time $T_2+T_3$, when the preparation of the HTTP response takes more than one round-trip time (as indicated by the latency reduction shown the lower portion of FIG. 2).

Figure 3:
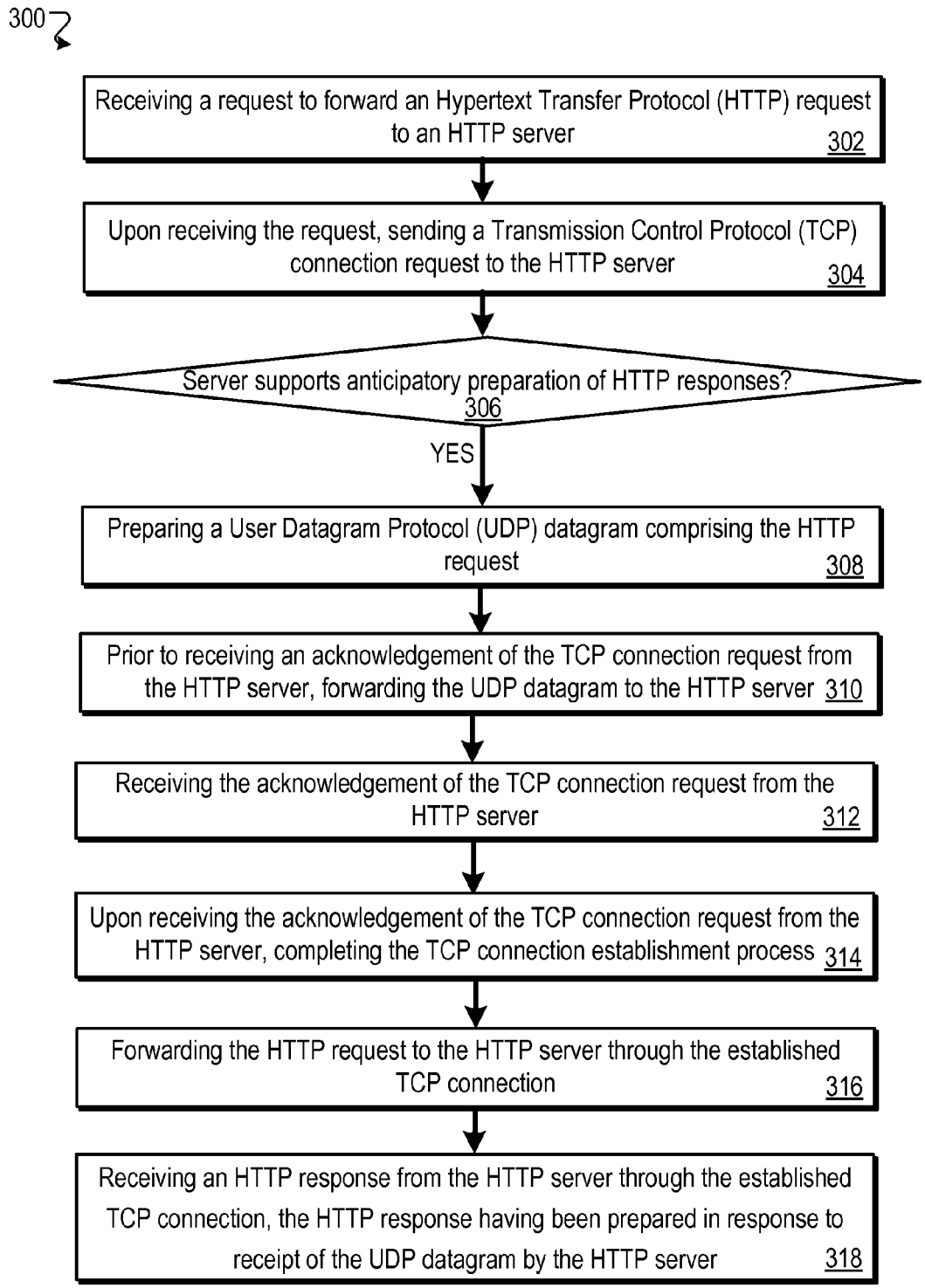
FIG. 3 is a flow diagram for an example client-side process implementing latency reduction using UDP.

FIG. 3 is a flow diagram for an example client-side process implementing latency reduction using UDP.

In some implementations, the process can be divided into a protocol negotiation stage in a prior session, and a stage for utilizing the UDP datagram for latency reduction of a particular HTTP request in a subsequent session. During the protocol negotiation stage, the client learns if a particular server supports latency reduction method using UDP. The protocol negotiation stage is not necessary if support for latency reduction using UDP is supported by a majority of HTTP servers, and no specific check needs to be performed.

Various methods of protocol negation are possible. In one implementation, the client advertises its capability for using UDP datagrams for latency reduction by injecting a short string into the user agent identifier string of each HTTP request it sends out to an HTTP server. The short string can be a specific code pattern or a flag. When an HTTP server that supports latency reduction using UDP receives a request with the specific code pattern or flag in the user agent identifier string, the server appends a "UDP pre-warming supported" code pattern or flag to the HTTP headers of its responses sent to the client. The client receiving the response records the server's domain name in a server list for reference in a future HTTP session when a new TCP connection needs to be established for HTTP requests. In another example, the server appends a list of URLs to the header of its response. The server chooses the URLs for which preparation of a response take a long time, such as those responses that require database resources and extensive computing. By specifying a list of URLs for which latency reduction using UDP is supported, a server ensures that latency reduction using UDP is only used if the amount of latency reduction warrants the extra processing involved in the latency reduction method. The client receiving the response stores the URLs in a URL store for reference in a next HTTP session when a new TCP connection needs to be established for HTTP requests. Various formats and content for the "UDP-pre-warming supported" string are possible.

In addition to having a protocol negotiation mechanism, the user agent also employs a mechanism (e.g., a user agent extension) to determine when latency reduction using UDP needs to be deployed. In one example, the user agent extension (e.g., a browser extension) registers a callback with the user agent (e.g., a browser). The callback is invoked when the user agent is ready to issue an HTTP request to a server (e.g., when a user enters a URL in the browser). The user agent extension can be a plug-in that utilizes the extension APIs provided by various browsers. Each time the notification is received, the UDP user agent extension determines if the user agent has to open a new TCP connection to the server before sending the HTTP request. If a new connection needs to be established first, the user agent extension consults the list of servers or URLs for which latency reduction using UDP is supported. If the request URL matches one of the URLs in the URL store, the user agent extension constructs a UDP datagram that contains the contents of the HTTP request (e.g., both the GET string and the HTTP header). This UDP datagram is sent to the server, and the TCP connection establishment is allowed to continue in parallel. The datagram is sent to the server after the TCP SYN packet has been sent, so that the TCP connection establishment does not incur any delay due to the use of the UDP datagram.

More specifically, the process on the client side starts when a request to forward a Hypertext Transfer Protocol (HTTP) request to an HTTP server is received (302). For example, when a user enters a URL in the browser's address bar or clicks on a link on a webpage, the browser receives the request to forward an HTTP request to the server identified in the URL. The browser notifies the browser extension of the request, and the browser extension determines if a new TCP connection to the server needs to be established. If so, upon receipt of the request, a TCP connection request is sent to the server from the user agent (304).

While the TCP connection request is under way, it is determined whether the server supports anticipatory preparation of HTTP responses, in response to HTTP requests sent in UDP datagrams (306). For example, the browser extension checks the URL in the HTTP request to see if it matches any of the URLs in the URL store for which latency reduction using UDP is supported. Alternatively, the browser extension checks the domain name of the server in the HTTP request to see if the server is among the list of servers that supports latency reduction using UDP.

If the server does support anticipatory preparation of HTTP responses for HTTP requests received in UDP datagrams, a UDP datagram comprising the HTTP request is prepared and forwarded to the server (308). If the server does not support anticipatory preparation of HTTP responses for HTTP requests received in UDP datagrams, or if the anticipatory preparation of HTTP response for a particular URL is not supported, user agent extension ignores the request, and does not prepare a UDP datagram for the request. In cases where UDP datagram is not prepared, the client prepares the HTTP request and sends it to the server through a TCP connection as it would normally do in the absence of the latency reduction techniques described in this specification.

Prior to receipt of an acknowledgement of the TCP connection request from the HTTP server, the UDP datagram is forwarded to the HTTP server (310). The acknowledgement is subsequently received from the HTTP server (312). Upon receipt of the acknowledgement of the TCP connection request from the HTTP server, the TCP connection establishment process is completed (314). The TCP connection establishment process is completed by the user agent sending out to the server an acknowledgement of the server's acknowledgement. Then, the HTTP request is forwarded to the HTTP server through the established TCP connection (316). An HTTP response is received from the HTTP server through the established TCP connection, where the HTTP response has been prepared in response to the receipt of the UDP datagram by the HTTP server (318).

FIG. 4 is a flow diagram for an example server-side process implementing latency reduction using UDP.

During the protocol negotiation stage, a client is notified of support for anticipatory preparation of HTTP responses for corresponding HTTP requests embedded in corresponding UDP datagrams (408). In one example, the server notifies the client of its support for latency reduction using UDP (e.g., by anticipatory preparation of the response) in the header of an HTTP response sent out in a prior HTTP session. Alternatively, a cookie is issued to the client in a prior HTTP session, the cookie identifying a URL (or a list of URLs) for which anticipatory preparation of HTTP responses is supported. Other methods of notifying clients of a server's support for latency reduction using UDP are possible.

During a subsequent HTTP session, first, a TCP connection request is received from the client (410). Prior to completion of a TCP connection establishment for the TCP connection request, a User Datagram Protocol (UDP) datagram is received from the client (412). The UDP datagram includes an HTTP request. In response to receipt of the UDP datagram, an HTTP response is prepared according to the HTTP request in the UDP datagram (414). In some implementations, a backend component is contacted for resources needed to construct the HTTP response. For example, if the HTTP request is for search results responsive to a search query, the server (e.g., a search engine) typically utilizes a search engine backend which involves a vast distributed network of computers to process the query and compile the list of relevant results responsive to the query. For another example, if the HTTP request is for invoking an application serving database resources, such as an internet mail service, the server also typically relies on a backend component to gather the user data and the mail data needed to render the user's mailbox.

After completion of the TCP connection establishment, one or more TCP data packets are received from the client through the established TCP connection, the one or more TCP data packets including the HTTP request (416). In response to receipt of the one or more TCP data packets, the prepared HTTP response is sent to the HTTP client through the established TCP connection (418).

In some cases, preparation of the HTTP response is completed after the one or more TCP data packets are received. In such cases, the maximum amount of latency reduction is achieved, which amounts to roughly one round trip time. In some implementations, a partial response is prepared and sent to the client after the HTTP request is received through the newly established TCP connection, while construction of the complete response is under way. Then, the complete HTTP response is sent to the client when it is constructed.

Since the HTTP requests sent through TCP and the HTTP requests sent through UDP typically do not arrive together, the server needs to monitor the states of all outstanding HTTP requests it has received and all outstanding responses it has prepared. In some implementations, the prepared HTTP response is sent to the HTTP client only if the one or more TCP data packets including the corresponding HTTP request have been received within a predetermined period of time after the UDP datagram was received. In some implementations, the prepared HTTP response is sent to the HTTP client only if the one or more TCP data packets including the corresponding HTTP request have been received within a predetermined period of time after the HTTP response has been prepared.

Since UDP is a connectionless protocol, UDP datagrams may become delayed or lost without knowledge of either the sender or the receiver. In such a scenario, a TCP connection request is received from an HTTP client. After a TCP connection is established with the HTTP client, an HTTP request is received from the HTTP client through the newly established TCP connection. It is determined whether a previous UDP datagram including the HTTP request has been received (e.g., by a unique identifier embedded in the HTTP request). If no previous UDP datagram including the HTTP request has been received, an HTTP response is prepared for the HTTP request received through the TCP connection. The HTTP response is sent when preparation of the HTTP response is completed. Since the HTTP request sent through the UDP datagram only serves to start the response preparation earlier than usual, the loss or delay of the datagram does not adversely affect the HTTP response time.

Figure 5:
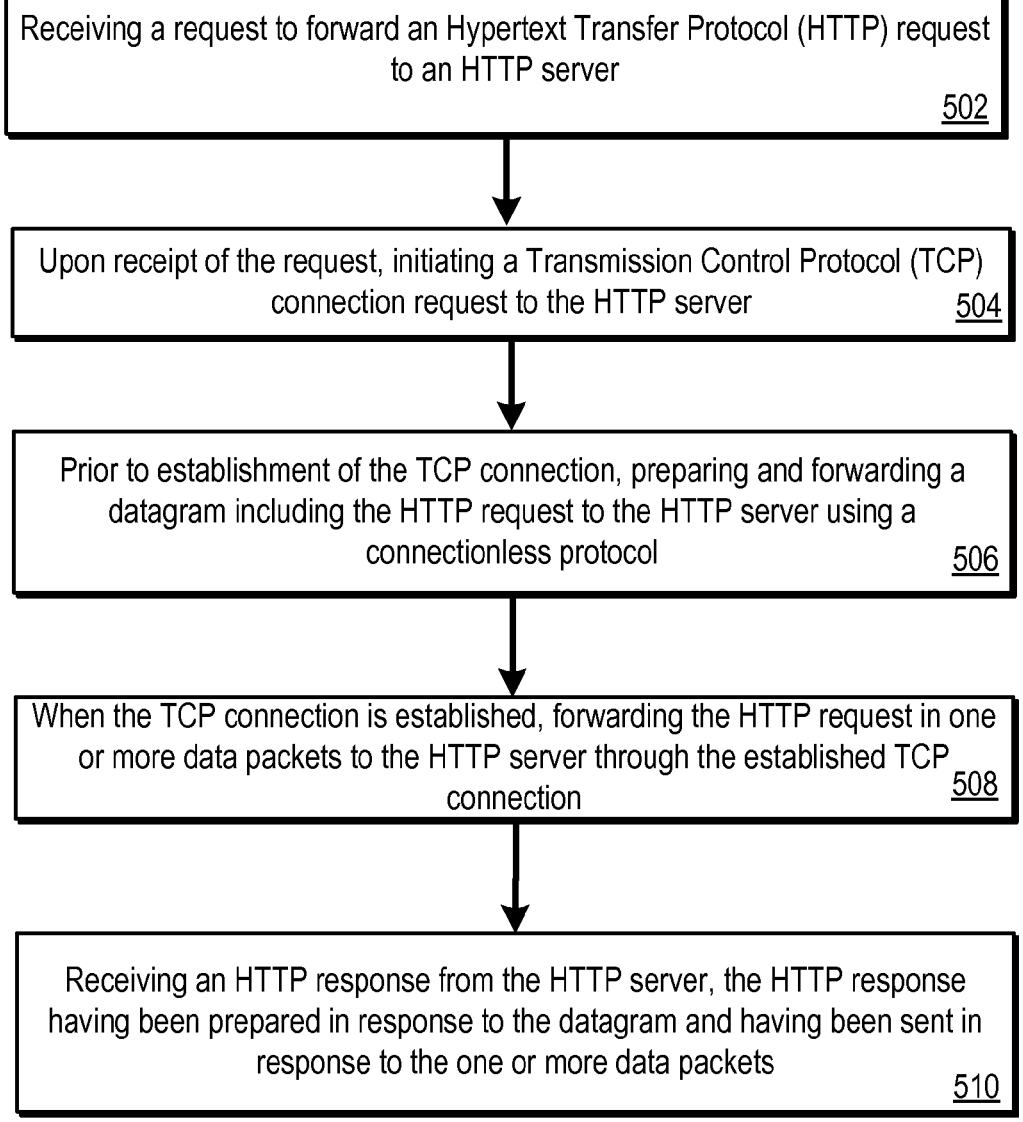
FIG. 5 is a flow diagram for an example client-side process implementing latency reduction using a connectionless protocol.

FIG. 5 is a flow diagram for an example client-side process implementing latency reduction using a connectionless protocol. UDP is one connectionless protocol that can be utilized for latency reduction according to the methods described in this specification. Other connectionless protocols may be employed as well, provided that an HTTP request can be efficiently sent through the connectionless protocol to the HTTP servers without hindering the normal TCP connection establishment process.

The process starts when a request to forward a Hypertext Transfer Protocol (HTTP) request to an HTTP server is received (502). Upon receipt of the request, a Transmission Control Protocol (TCP) connection request to the HTTP server is initiated (504). Prior to establishment of the TCP connection, a datagram including the HTTP request is prepared and forwarded to the HTTP server using a connectionless protocol (506). When the TCP connection is established, the HTTP request is forwarded in one or more data packets to the HTTP server through the established TCP connection (508). An HTTP response is received from the HTTP server, the HTTP response having been prepared in response to the datagram and having been sent in response to the one or more data packets (510).

Figure 6:
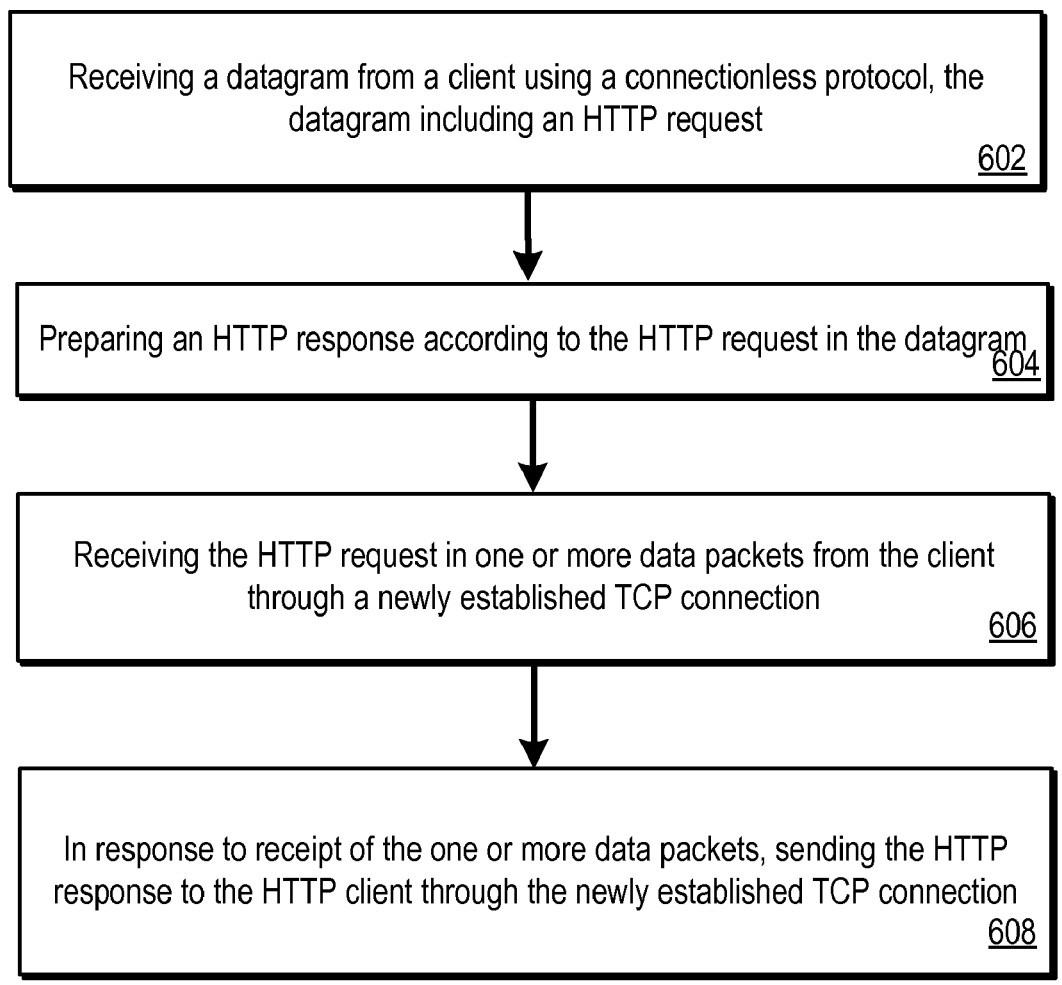
FIG. 6 is a flow diagram for an example server-side process implementing latency reduction using a connectionless protocol.

FIG. 6 is a flow diagram for an example server-side process implementing latency reduction using a connectionless protocol. The process starts when a datagram is received from a client using a connectionless protocol, the datagram including an HTTP request (602). An HTTP response is prepared according to the HTTP request in the datagram (604). The HTTP request is received in one or more data packets from the client through a newly established TCP connection (606). In response to receipt of the one or more data packets, the HTTP response is sent to the HTTP client through the newly established TCP connection (608).

Although the methods are described in the context of HTTP requests, the methods are applicable to variants or extensions of the HTTP protocol as well. Furthermore, other application layer protocols that utilize a connected, reliable transport protocol (e.g., TCP) as the primary transport layer protocol can also benefit from this latency reduction method using UDP.

Although the methods are described in the context of response construction for an HTTP request, the UDP latency reduction technique described in this specification can be used for pre-warming a backend component prior to issuance of the HTTP request. For example, if a browser stores certain cookies indicating certain servers that support latency reduction using UDP, the browser can send out UDP requests to those servers to pre-warm the data likely to be used by the client before an HTTP request is issued (e.g., before a user actually logs onto any of those servers).

In some cases, the acceptance of UDP requests may render a server vulnerable to denial-of-service (DOS) attacks. In order to mitigate the risk of DOS attacks, a web service can allocate the UDP service to a unique hostname, and if a DOS attack on the particular host is detected or suspected, the web server can disable routing of those UDP requests to those hosts. For example, a threshold number of UDP requests per minute can be set for a host. Once that threshold number is exceeded, newly arrived UDP requests can be dropped and the server starts to respond only to requests sent through established TCP connections.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
receiving a request to forward an Hypertext Transfer Protocol (HTTP) request to an HTTP server;
upon receiving the request, sending a Transmission Control Protocol (TCP) connection request to the HTTP server;
preparing, by a processor, a User Datagram Protocol (UDP) datagram comprising the HTTP request;
prior to receiving an acknowledgement of the TCP connection request from the HTTP server, forwarding the UDP datagram to the HTTP server;
upon receiving the acknowledgement of the TCP connection request from the HTTP server, completing the TCP connection establishment process;
forwarding the HTTP request to the HTTP server through the established TCP connection;
prior to preparing the UDP datagram, determining whether the HTTP server supports anticipatory preparation of HTTP responses for corresponding HTTP requests embedded in corresponding UDP datagrams; and
preparing and forwarding the UDP datagram only if the HTTP server supports the anticipatory preparation.

2. The method of claim 1, further comprising:
receiving an HTTP response from the HTTP server through the established TCP connection, the HTTP response having been prepared in response to receipt of the UDP datagram by the HTTP server.

3. A computer-implemented method, comprising:
receiving a Transmission Control Protocol (TCP) connection request from a client;
prior to completion of a TCP connection establishment for the TCP connection request, receiving a User Datagram Protocol (UDP) datagram from the client, the UDP datagram comprising an HTTP request;
in response to receiving the UDP datagram, preparing, by processor, an HTTP response according to the HTTP request in the UDP datagram;
after completion of the TCP connection establishment, receiving one or more TCP data packets from the client through the established TCP connection, the one or more TCP data packets comprising the HTTP request; and
in response to receiving the one or more TCP data packets, sending the prepared HTTP response to the HTTP client through the established TCP connection.

4. The method of claim 3, further comprising:
prior to receiving the UDP datagram, notifying the client of support for anticipatory preparation of HTTP responses for corresponding HTTP requests embedded in corresponding UDP datagrams.

5. The method of claim 4 wherein notifying further comprises:
issuing a cookie to the client in a prior HTTP session, the cookie identifying a URL for which the anticipatory preparation of HTTP responses is supported.

6. The method of claim 3, wherein preparing the HTTP response further comprises:
contacting a backend component for resources needed to construct the HTTP response.

7. The method of claim 3, wherein preparation of the HTTP response in response to receiving the UDP datagram is completed after the one or more TCP data packets are received.

8. The method of claim 3, wherein sending the prepared HTTP response further comprises:
sending the prepared HTTP response to the HTTP client only if the one or more TCP data packets have been received within a predetermined period of time after the UDP datagram was received.

9. The method of claim 3, wherein sending the prepared HTTP response further comprises:
sending the prepared HTTP response to the HTTP client only if the one or more TCP data packets have been received within a predetermined period of time after the HTTP response has been prepared.

10. The method of claim 3, further comprising:
receiving a second TCP connection request from a second HTTP client;
after a second TCP connection is established with the second HTTP client, receiving a second HTTP request from the second HTTP client through the second TCP connection;

determining whether a previous UDP datagram comprising the second HTTP request has been received; and if no previous UDP datagram comprising the second HTTP request has been received, preparing a second HTTP response for the second HTTP request; and sending the second HTTP response when preparation of the second HTTP response is completed.

11. The method of claim 3, wherein the HTTP request is for search results responsive to a search query.

12. The method of claim 3, wherein the HTTP request is for invoking an application serving database resources.

13. A computer storage medium encoded with a computer program, the program comprising instructions that when executed by data processing apparatus cause the data processing apparatus to perform operations comprising:

receiving a request to forward an Hypertext Transfer Protocol (HTTP) request to an HTTP server;

upon receiving the request, sending a Transmission Control Protocol (TCP) connection request to the HTTP server;

preparing a User Datagram Protocol (UDP) datagram comprising the HTTP request;

prior to receiving an acknowledgement of the TCP connection request from the HTTP server, forwarding the UDP datagram to the HTTP server;

upon receiving the acknowledgement of the TCP connection request from the HTTP server, completing the TCP connection establishment process;

forwarding the HTTP request to the HTTP server through the established TCP connection;

prior to preparing the UDP datagram, determining whether the HTTP server supports anticipatory preparation of HTTP responses for corresponding HTTP requests embedded in corresponding UDP datagrams; and preparing and forwarding the UDP datagram only if the HTTP server supports the anticipatory preparation.

14. A computer storage medium encoded with a computer program, the program comprising instructions that when executed by data processing apparatus cause the data processing apparatus to perform operations comprising:

receiving a Transmission Control Protocol (TCP) connection request from a client;

prior to completion of a TCP connection establishment for the TCP connection request, receiving a User Datagram Protocol (UDP) datagram from the client, the UDP datagram comprising an HTTP request;

in response to receiving the UDP datagram, preparing an HTTP response according to the HTTP request in the UDP datagram;

after completion of the TCP connection establishment, receiving one or more TCP data packets from the client through the established TCP connection, the one or more TCP data packets comprising the HTTP request; and in response to receiving the one or more TCP data packets, sending the prepared HTTP response to the HTTP client through the established TCP connection.

15. The computer storage medium of claim 14, wherein preparing the HTTP response further comprises:

contacting a backend component for resources needed to construct the HTTP response.

16. A system comprising:

one or more processors;

memory coupled to the one or more processors and operable for storing instructions, which, when executed by the one or more processors, cause the one or more processors to perform operations, comprising:

receiving a request to forward a Hypertext Transfer Protocol (HTTP) request to an HTTP server;

upon receiving the request, sending a Transmission Control Protocol (TCP) connection request to the HTTP server;

preparing a User Datagram Protocol (UDP) datagram comprising the HTTP request;

prior to receiving an acknowledgement of the TCP connection request from the HTTP server, forwarding the UDP datagram to the HTTP server;

upon receiving the acknowledgement of the TCP connection request from the HTTP server, completing the TCP connection establishment process;

forwarding the HTTP request to the HTTP server through the established TCP connection;

prior to preparing the UDP datagram, determining whether the HTTP server supports anticipatory preparation of HTTP responses for corresponding HTTP requests embedded in corresponding UDP datagrams; and preparing and forwarding the UDP datagram only if the HTTP server supports the anticipatory preparation.

17. A system comprising:

one or more processors;

memory coupled to the one or more processors and operable for storing instructions, which, when executed by the one or more processors, cause the one or more processors to perform operations, comprising:

receiving a Transmission Control Protocol (TCP) connection request from a client;

prior to completion of a TCP connection establishment for the TCP connection request, receiving a User Datagram Protocol (UDP) datagram from the client, the UDP datagram comprising an HTTP request;

in response to receiving the UDP datagram, preparing an HTTP response according to the HTTP request in the UDP datagram;

after completion of the TCP connection establishment, receiving one or more TCP data packets from the client through the established TCP connection, the one or more TCP data packets comprising the HTTP request; and in response to receiving the one or more TCP data packets, sending the prepared HTTP response to the HTTP client through the established TCP connection.

18. The system of claim 17, wherein preparing the HTTP response further comprises:

contacting a backend component for resources needed to construct the HTTP response.

19. The system of claim 17, wherein the instructions further comprise:

receiving a second TCP connection request from a second HTTP client;

after a second TCP connection is established with the second HTTP client, receiving a second HTTP request from the second HTTP client through the second TCP connection;

determining whether a previous UDP datagram comprising the second HTTP request has been received; and if no previous UDP datagram comprising the second HTTP request has been received, preparing a second HTTP response for the second HTTP request; and sending the second HTTP response when preparation of the second HTTP response is completed.

* * * * *